United States Patent [19]
Hall et al.

[11] Patent Number: 5,224,826
[45] Date of Patent: Jul. 6, 1993

[54] PIEZOELECTRIC HELICOPTER BLADE FLAP ACTUATOR

[75] Inventors: Steven R. Hall, Billerica; Ronald L. Spangler, Jr., Boston, both of Mass.

[73] Assignee: Massachusetts Institute of Technology, Cambridge, Mass.

[21] Appl. No.: 385,709

[22] Filed: Jul. 26, 1989

[51] Int. Cl.$^5$ .............................................. B64C 23/00
[52] U.S. Cl. .......................................... 416/4; 416/39
[58] Field of Search ................ 416/4, 23, 30, 31, 35, 416/36, 37, 39, 87, 88, 131, 132 R, 132 A; 244/215, 7 C, 48

[56] References Cited

U.S. PATENT DOCUMENTS

| | | | |
|---|---|---|---|
| 2,405,208 | 8/1946 | Harris | 416/23 |
| 2,441,151 | 5/1948 | Jones | 416/23 |
| 3,930,626 | 1/1976 | Croswell, Jr. | 416/23 |
| 4,235,397 | 11/1980 | Compton | 416/23 |
| 4,461,611 | 7/1984 | Michel | 416/31 |
| 4,514,143 | 4/1985 | Campbell | 416/145 |

FOREIGN PATENT DOCUMENTS 0577300 10/1977 U.S.S.R. .................... 416/132 R

OTHER PUBLICATIONS

R. E. Duffy, et al., "A Theoretical and Experimental Study of the Snap-Through Airfoil and its Potential as a Higher Harmonic Control Device," Jan. 11–Jan. 14, 1988.
E. F. Crawley, "Induced Strain Actuation of Isotropic and Anisotropic Plates", Apr. 16, 1989.
Edward F. Crawley, et al., "Feasibility Analysis of Piezoelectric Devices" Jan. 1988.
Edward F. Crawley, et al., "Use of Piezoelectric Actuators as Elements of Intelligent Structures" Jan. 1987.

Primary Examiner—Edward K. Look
Assistant Examiner—Hoang Nguyen
Attorney, Agent, or Firm—Choate, Hall & Stewart

[57] ABSTRACT

Electrically deformable material such as piezoelectric material is used to deform a deflectable flap on an airfoil such as a helicopter blade. The electrically deformable material is controlled to deflect the flap in a manner to control vibrations transmitted from a helicopter blade to the helicopter air frame. In a preferred embodiment, the electrically deformable material and mechanical linkages are segmented along the length of the rotor blade. In this way, differential actuation of the deformable elements results in variable flap deflections along the length of the rotor.

4 Claims, 2 Drawing Sheets

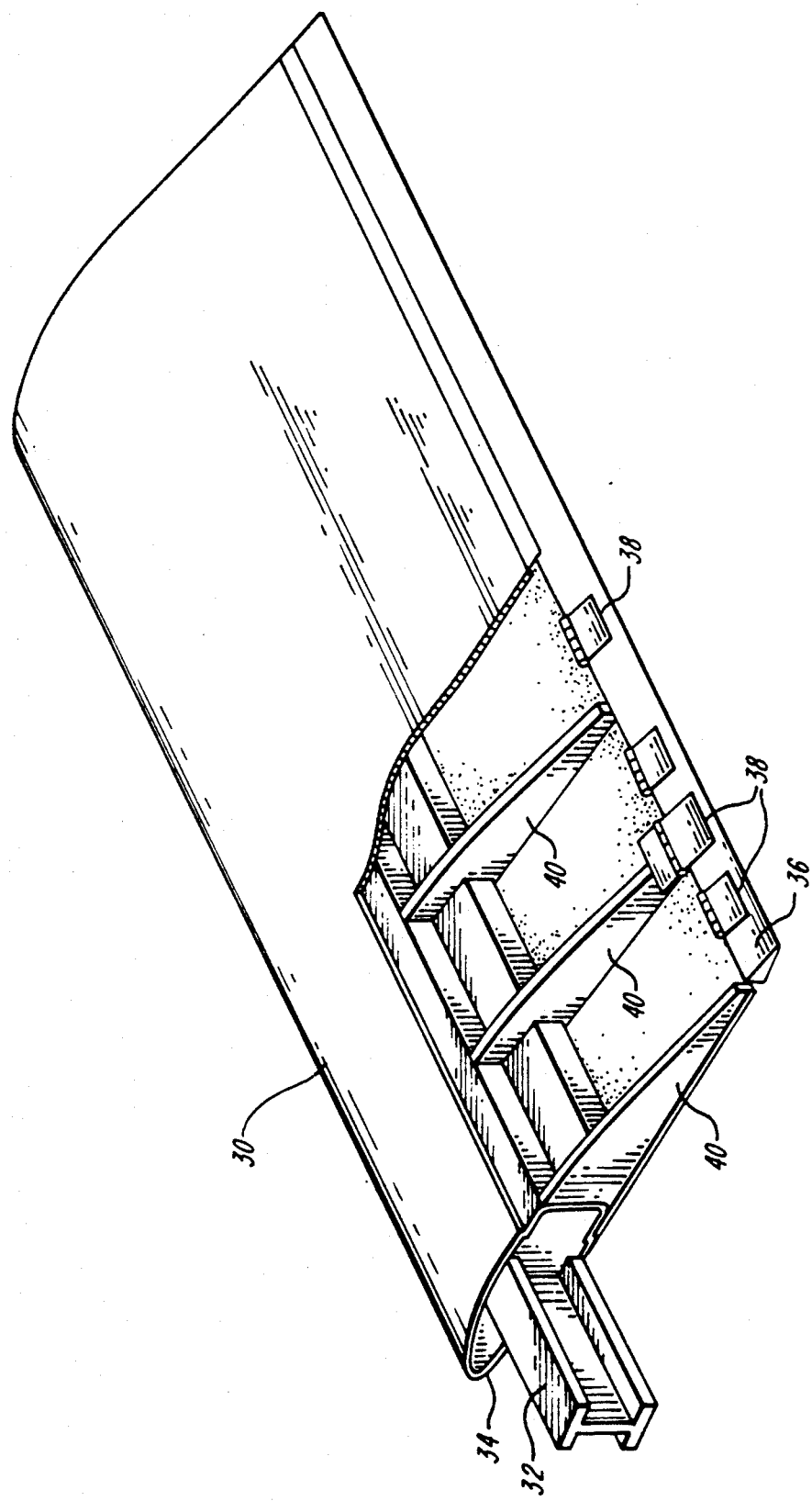

5,224,826

PIEZOELECTRIC HELICOPTER BLADE FLAP ACTUATOR

BACKGROUND OF THE INVENTION

This invention relates to airfoil flap actuation.

Conventional helicopter flight control is achieved through the use of a swashplate/pitch linkage system driving the individual blades. One purpose of the swashplate, therefore, is to mechanically transmit the pilot's control commands from the nonrotating frame to the rotor. Currently, however, there is a growing interest in the field of automatic control of vibrations transmitted to the helicopter airframe from the rotor at certain multiples (higher harmonics) of the basic rotational frequency. Aerodynamic control forces can be applied to the rotor to reduce these vibration levels by actively changing the pitch of the individual blades; however, the effective frequency range of the hydraulically driven conventional swashplate is low relative to the higher harmonic frequencies. In addition to this problem, the complex nature of the airflow field in the region of the rotor makes it desirable to have the option of varying the control force along the blades—an impossibility in the swashplate system. Thus a need has arisen for an aerodynamic control device which can be mounted in the rotating frame as well as possessing good high-frequency response.

Several basic problems must be surmounted before any progress can be made in the design of such an active device. Firstly, the devices require power which must be transmitted from a source in the nonrotating frame, and secondly the effects of a centripetal acceleration field on the order of hundreds of gravities must be taken into consideration. Both considerations eliminate a priori the use of any type of conventional hydraulic system, both in the transmitting of fluids back and forth between the two frames and in the high pressures which would result from the centripetal acceleration of the fluid. Electrical power, however, can be transmitted to the rotating frame with relative ease through a slipring system. (Indeed, such a system is currently used to power de-icing boots in certain helicopters.) The relatively massive moving parts inherent to electromagnetic motors raise difficulties, once again, due to centrifugal forces.

SUMMARY OF THE INVENTION

The aerodynamic control device according to the invention includes an airfoil with a deflectable flap and an electrically deformable material mounted to deflect the flap upon electrical stimulation. The invention is particularly applicable to a helicopter blade and a preferred electrically deformable material is piezoelectric material. It is also preferred that the electrically deformable material be configured to bend upon electrical stimulation. Other deformable materials such as magnetostrictive and electrostrictive elements may be used.

In a particularly preferred embodiment, the helicopter blade includes a spar at the leading edge, a deflectable flap at the trailing edge and is segmented along the length of the blade. The piezoelectric material is divided such that the material in each segment is controlled separately, allowing variable deflection along the length of the flap.

BRIEF DESCRIPTION OF THE DRAWING

FIG. 2 is a perspective view, partially cut away, illustrating another aspect of the invention.

DESCRIPTION OF THE PREFERRED EMBODIMENT

Figure 1:
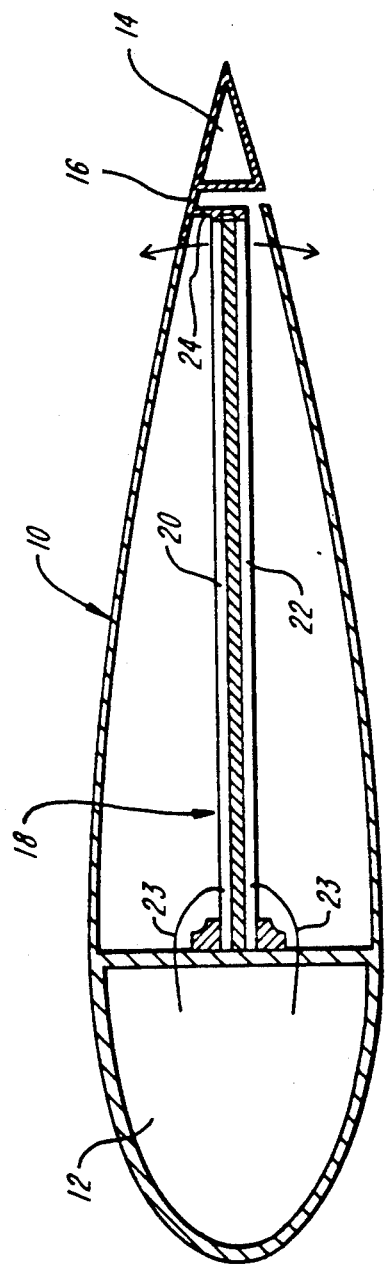
FIG. 1 is a cross sectional view of a helicopter blade illustrating the invention.

The present invention is based on the recognition that certain materials may be deformed electrically and this deformation may be used to deflect a flap on an airfoil. As those skilled in the art will appreciate, electrically deformable materials include piezoelectric, magnetostrictive, and electrostrictive material. It is well known, for example, that piezoelectric materials mechanically deform (expand, contract, or distort) upon the application of an electric field across the material. The present invention utilizes electrically deformable materials to deflect a flap or trim tab so as to alter aerodynamic loading on a blade which can be used to control vibrations transmitted to a helicopter airframe from the rotor blade. Piezoelectric, and other electrically deformable materials, can be used as an integral part of a structure such as a helicopter blade, adding little or no mass and avoiding the conventional electric motor mass limitations discussed above. This lower mass results in an actuator of much higher bandwidth than both hydraulic and electromagnetic systems.

With reference to FIG. 1, a helicopter blade 10 includes a torsionally stiff "D" spar 12 comprising the front section of the helicopter blade 10. The rear portion of the blade 10 includes a flap 14 supported by a hinge or flexure portion 16. Affixed in cantilever fashion to the spar 12 is the proximal end of a piezoelectric bending beam 18. The piezoelectric beam 18 consists of a pair of piezoelectric plates 20 and 22. If these plates are polarized in the same direction during manufacture then excitation by electric fields in opposing direction causes bending. Alternatively, if the plates are polarized in opposing directions during manufacture then excitation by electric fields of the same polarity causes bending. Alternatively, one piezoelectric plate operating against an inert plate, of aluminum for example, will also produce bending. The electric fields are provided by any convenient electrical source (not shown) through leads 23 to thin metallic electrodes deposited on the plates surfaces as readily understood by those skilled in the art. A piezoelectric bender 18 is commercially available from several manufacturers. The distal end of the piezoelectric bending beam 18 is affixed, by means of a tab 24, to the flexure portion 16.

In operation, as one of the piezoelectric plates 20,22 expands, the other plate contracts, causing the piezoelectric beam 18 to deflect by bending. This geometry acts as a mechanical amplifier turning relatively small extensional plate displacements into relatively large transverse deflections at the distal end of the beam 18. Additional mechanical amplification is achieved by attaching the tab 24 to the flexure 16 at a distance from the effective hinge point of the flexure 16. Deflections on the order of 10° of the flap 14 can thus be achieved under reasonable airloads. This magnitude of flap deflection is sufficient to produce significant changes in both the lifting and pitching forces on the airfoil 10. As those skilled in the art will appreciate during the design procedure, it is necessary to take into account the aerodynamic force which opposes any flap deflection as well as the force available from the piezoelectric beam in the blade 10. For a given flight speed, the piezoelectric actuator must be large enough to match the aerodynamic moment produced by given design flap deflection angle. The lever arm over which the piezoelectric force acts to produce the actuating moment is chosen to optimize the design for the given design speed.

FIG. 2 is an experimental embodiment of the invention utilizing multiple, independently actuable sections along the length of the helicopter rotor blade. A blade or wing 30 includes a hardwood and aluminum I beam 32 within the leading edge spar 34. A deflectable flap 36 is hinged to the blade 30 by hinges 38. Disposed along the length of the blade 30 are a plurality of electrically deformable actuators 40 which are independently controllable to deflect the flap 36 by varying amounts along the length of the blade 30.

In operation, electrical signals are delivered to the piezoelectric beam benders to cause the beam to deflect. The deflection in turn causes the flap deflection. A test specimen, built of fiberglass, has been constructed and tested extensively in the 1'×1' wind tunnel in the Department of Aeronautics and Astronautics at the Massachusetts Institute of Technology in Cambridge, Mass. An examination of the data obtained during the experiments indicates that the aeroelastically scaled model has met the design objectives, mainly that of achieving a 10° flap deflection under design point flight conditions. Design and experiments are disclosed in detail in Spangler, R. L., Jr., "Piezoelectric Actuators for Helicopter Rotor Control," SM Thesis, MIT, January, 1989.

Although the preferred embodiments have been described as utilizing piezoelectric materials, it will be appreciated by those skilled in the art that other electrically deformable materials such as electrostrictive and magnetostrictive materials may be used to effect flap deflection. While the invention has been described in conjunction with specific embodiments, it is intended that all modifications and variations of these embodiments be included within the scope of the appended claims.

What is claimed is:

1. An aerodynamic control device comprising:
an airfoil having a spar at the leading edge and a deflectable flap at the trailing edge, and
at least one deformation member comprising an electrically deformable material, said member being mounted within the airfoil and cantilevered to the spar of the airfoil at one end and attached to the deflectable flap at the other end so that electrical stimulation of the material causes the deformation member to bend to deflect the flap,
wherein the deformation member includes an inert plate and a plate comprising an electrically deformable material which operates against the inert plate whereby an electric field applied to the electrically deformable plate causes bending of the plates and deflection of the flap.

2. An aerodynamic control device comprising:
an airfoil having a spar at the leading edge and a deflectable flap at the trailing edge, and
at least one deformation member comprising an electrically deformable material, said member being mounted within the airfoil and cantilevered to the spar of the airfoil at one end and attached to the deflectable flap at the other end so that electrical stimulation of the material causes the deformation member to bend to deflect the flap,
wherein the deformation member includes at least two plates of electrically deformable material bonded together whereby electric fields equal in magnitude but opposite in direction are applied to each plate causing bending of the plates and deflection of the flap.

3. An aerodynamic control device comprising:
an airfoil having a spar at the leading edge and a deflectable flap at the trailing edge, and
at least one deformation member comprising an electrically deformable material, said member being mounted within the airfoil and cantilevered to the spar of the airfoil at one end and attached to the deflectable flap at the other end by a lever apparatus so that electrical stimulation of the material causes the deformation member to bend and the lever apparatus to amplify the deformation member bending so as to deflect the flap,
wherein the deformation member includes an inert plate and a plate comprising an electrically deformable material which operates against the inert plate whereby an electric field applied to the electrically deformable plate causes bending of the plates and deflection of the flap.

4. An aerodynamic control device comprising:
an airfoil having a spar at the leading edge and a deflectable flap at the trailing edge, and
at least one deformation member comprising an electrically deformable material, said member being mounted within the airfoil and cantilevered to the spar of the airfoil at one end and attached to the deflectable flap at the other end by a lever apparatus so that electrical stimulation of the material causes the deformation member to bend and the lever apparatus to amplify the deformation member bending so as to deflect the flap,
wherein the deformation member includes at least two plates of electrically deformable material bonded together whereby electric fields equal in magnitude but opposite in direction are applied to each plate causing bending of the plates and deflection of the flap.

* * * * *